Patented Mar. 18, 1941

2,235,786

UNITED STATES PATENT OFFICE 2,235,786

PENTOSIDE ETHERS

Elwood V. White, Moscow, Idaho, assignor to The Dow Chemical Company, Midland, Mich., a corporation of Michigan No Drawing. Application September 13, 1939, Serial No. 294,683

8 Claims. (Cl. 260—210)

This invention relates to new and useful glycosidic derivatives of pentose ethers.

It has been found that new pentoside ethers may be obtained in an advantageous manner by the etherification of alkali hemi-cellulose claimed in my co-pending application, Serial No. 294,682, to be more fully described hereinafter. These new compounds have considerable utility in the arts as plasticizers for cellulose derivative compositions and as intermediates in the preparation of alkyd resins and the like.

The new compounds are defined as substances of the general formula

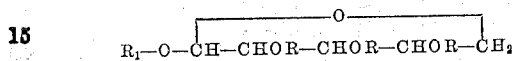

$$R_1-O-CH-CHOR-CHOR-CHOR-CH_2$$

wherein at least one R is alkyl or aralkyl, the remainder being hydrogen, $R_1$ is alkyl, aralkyl, cycloalkyl, hydroxy-alkyl, alkoxy-alkyl, or aryloxy-alkyl, and wherein at least one of the radicals R and $R_1$ contains more than one carbon atom. The formula given imposes no stereochemical limitation on the invention, which relates equally to xylosides, arabinosides, and other pentosides.

Examples of the new glycosides are ethyl 2.3-diethyl xyloside, ethyl 2.3-dibenzyl xyloside, ethyl mono-ethyl xyloside, cyclohexyl 2.3-dibutyl xyloside, butyl mono-ethyl xyloside, lauryl 2.3-diethyl xyloside, ethyl 2.3.4-triethyl xyloside, cyclohexyl methyl xylosides, beta-hydroxy-ethyl mono-, di- and tri-benzyl xylosides, benzyl mono-benzyl xyloside, beta-methoxy ethyl 2.3-dimethyl xyloside, and beta-phenoxy ethyl benzyl xylosides.

As a first step in the preparation of the new bodies of this invention, a quantity of alkali hemi-cellulose is taken having an alkali: hemi-cellulose ratio of from 1.5-14:1 and a water:hemi-cellulose ratio correspondingly from 0.8-4.0:1 made in the manner described in the above-mentioned co-pending application, and treated with an alkylating or aralkylating agent in the manner well known to the art to form a pentosan ether substituted in one or more of the positions 2 and 3 in the pentose chain. The ether is isolated and heated with a primary or secondary alcohol type compound of the class of alkanols, aralkanols, cycloalkanols, alkanoxy-alkanols, hydroxy-alkanols, or aryloxy-alkanols in the presence of a catalytic quantity of a mineral acid. By such reaction a completely etherified pentosan will yield a glycoside of a 2.3-di-substituted pentose, while a lower etherified pentosan will give a mixture of 2.3-di-substituted, and 2 and 3 mono-substituted and unsubstituted glycosides. Any of these products may be further etherified to yield glycosides of 2.3.4-tri-substituted pentoses.

For most uses it is unnecessary to effect separation of mono-substituted from di-substituted derivatives, but a practically complete separation may be made by the usual distillation methods after neutralization and filtration of the reaction mixture.

The new compounds may be reduced to form pentitol ethers and may be employed as solvents or modifying agents in cellulose derivative compositions.

The following examples illustrate the practice of the invention:

EXAMPLE 1.—*Preparation of ethyl mixed mono- and di-ethyl xylosides*

156 grams of ethyl pentosan containing 43 per cent of $OC_2H_5$ are placed in a pressure vessel and 600 c. c. of alcohol containing 2 per cent hydrochloric acid gas are added. The tube contents are thoroughly mixed and heated for 4 hours at 125° C. After cooling, the tube is opened and the reaction product, consisting largely of a liquid and containing a small residue of solid, is neutralized with barium carbonate, diluted with 2 volumes of ethyl alcohol and centrifuged. The separated liquor is evaporated to a syrup in vacuo, then distilled, giving a fraction coming over at 130°–140° C. under 1.5 mm. pressure, weighing 83 grams, and having an ethoxyl content of 53 per cent.

EXAMPLE 2.—*The preparation of benzyl mixed mono- and di-ethyl xylosides*

In a manner analogous to that set forth in the preceding example, 24 grams of ethyl hemi-cellulose was dissolved in 76 c. c. of benzyl alcohol and treated with a solution consisting of 23 c. c. of benzyl alcohol containing 10 per cent of hydrogen chloride. The reaction mixture was sealed in a pressure vessel and heated for 7 hours at 150° C. The product was neutralized, filtered, clarified and distilled in the customary manner and gave two principal fractions. The first, boiling at 133°–167° C. at 1 mm., weighed 13 grams, had a refractive index of 1.5050, and an ethoxyl content of 25.6 per cent, representing an average degree of substitution in the pentose nucleus of 1.6 ethyl radicals per mole. The second fraction, which boiled between 167°–184° C. at 1 mm. weighed 29 grams, had a refractive index of 1.5028 and containing 30.2 per cent ethoxyl, representing an average degree of substitution of 1.95 ethoxy groups per mole. The products were light yellow viscid liquids.

EXAMPLE 3.—*Preparation of "Lorol" ethyl xyloside*

In similar manner 22.4 grams of ethyl hemi-cellulose was reacted with 100 c. c. of commercial "Lorol" (a mixture of higher fatty alcohols containing as the principal constituent lauryl alcohol) to which had been added 2 per cent by weight of hydrogen chloride. The mixture was heated for 5 hours at 125° C. and, after neutralization and separation of the reaction mixture from insoluble materials, the products were a viscous liquid which boiled in the range from 140°–220° C. at 2 mm. Refractionation gave a fraction boiling at 175°–190° C. at 2 mm., having an ethoxyl value of 17.3 per cent, corresponding to 1.45 ethoxyl groups per xylose unit, and a fraction between 190°–205° C. at 2 mm. containing 19.7 per cent ethoxyl (1.6 ethoxyl groups per xylose unit).

EXAMPLE 4.—*Preparation of ethyl benzyl xylosides*

16.5 grams of benzyl hemi-cellulose was dissolved in 600 c. c. of absolute ethanol containing 2 per cent of hydrogen chloride. The mixture was heated for 12 hours at 125° C. under super-atmospheric pressure. The product taken for distillation was a clear, light liquid boiling within the range between 124°–193° C. at about 1 mm., the principal fractions being separated in the two ranges 124°–141° C. and 180°–193° C. at about 1 mm. The ethyl benzyl xylosides had refractive indexes of about 1.536 and contained an average of 1.31 benzyloxy groups per mole. The average ethoxy content of the two fractions obtained was about 13.8 per cent.

I claim:

1. A compound having the general formula $$R_1O-\overset{\overset{\displaystyle\longmapsto O \longmapsto}{|}}{C}H-CHOR-CHOR-CHOR-CH_2$$

wherein at least one R is a radical selected from the class consisting of alkyl and aralkyl, and the balance of the radicals R are hydrogen, $R_1$ is a radical selected from the class consisting of the primary and secondary alkyl, aralkyl, cycloalkyl, hydroxy-alkyl, alkoxy-alkyl, and aryloxy-alkyl radicals, and wherein at least one of the radicals R and $R_1$ contains more than one carbon atom.

2. A compound having the general formula set forth in claim 1, wherein $R_1$ is a primary alkyl radical.

3. A compound having the general formula set forth in claim 1, wherein $R_1$ is a primary aralkyl radical.

4. A compound having the general formula set forth in claim 1, wherein at least one of the radicals R and $R_1$ is an ethyl group.

5. A compound having the general formula set forth in claim 1, wherein at least one of the radicals R and $R_1$ is a benzyl group.

6. A mixture consisting of an ethyl mono-ethyl xyloside and ethyl 2.3-diethyl xyloside.

7. A mixture consisting of ethyl mono-benzyl xyloside and ethyl dibenzyl xyloside.

8. Ethyl 2.3-diethyl xyloside.

ELWOOD V. WHITE.